United States Patent Office 3,594,438
Patented July 20, 1971

3,594,438
CATALYTIC CONVERSION OF 3-CARENE BY ETA ALUMINA
James O. Bledsoe, Jr., Jacksonville, Fla., assignor to SCM Corporation, New York, N.Y.
No Drawing. Filed Aug. 27, 1969, Ser. No. 853,501
Int. Cl. C07c 5/00; C09f 3/00
U.S. Cl. 260—675.5
9 Claims

ABSTRACT OF THE DISCLOSURE

Alumina in the form of eta alumina is used catalytically to convert 3-carene to a mixture of dipentene and carvestrene with increased yields and suppression of undesirable by-products.

BACKGROUND AND SUMMARY OF THE INVENTION

The present invention relates to a process for catalytically converting 2-carene to dipentene and/or carvestrene by the use of eta alumina wherein increased yields are obtained with suppression of unwanted by-products, such as other terpenes.

Because of the tendency of 3-carene to form m-menthadienes as well as para-isomers, 3-carene has not enjoyed the commercial success that the pinenes have attained in the terpene chemistry field. Further, although 3-carene is readily available, being a component of turpentine, it has not been substantially used in commerce since it does not polymerize to a hard resin. In contrast, other terpenes such as dipentene and carvestrene do form a terpene resin upon polymerization having a relatively high softening point, for example about 147 degrees centigrade. Dipentene and carvestrene can occur in combination, and since their boiling points are so close, it is not practical to separate them by fractional distillation. Nor, for that matter, is separation necessary, since a mixture of the two terpenes can readily be used for those applications where either one is suited.

Dipentene and carvestrene are therefore important terpenes, whether used alone or in combination. They comprise, for example, starting materials for forming valuable terpene resins useful in perfumery, bases for chewing gum, pressure-sensitive adhesives, and the like. Also, when the supply of alpha or beta pinene is low, dipentene and carvestrene may be used in place of such pinenes for their many commercial applications. It would therefore advance the art to provide an economical, commercial process for the production of dipentene and/or carvestrene from 3-carene.

It is known that dipentene and carvestrene can be prepared by passing 3-carene over alumina at elevated temperatures. However, the yield of dipentene and carvestrene is relatively low for example, 35 percent or lower, and in addition other undesirable complex mixes may be formed.

It has now been found that if the alumina employed is eta alumina, a transitional state alumina, substantially increased yields are obtained, for instance, on the order of 78 percent by weight, based on unreacted 3-carene.

DESCRIPTION OF THE PREFERRED EMBODIMENTS

In accordance with the present invention, eta alumina catalytically converts 3-carene to dipentene or carvestrene, and usually to a mixture of those two terpenes.

There are several phase-transitional, meta-stable aluminas known in the art. These aluminas differ from each other and are characterized by particular crystal lattices or crystal packing which occur successively as, for instance, alumina is heated at calcining temperatures. The present development concerns that transitional form of alumina known in the art as eta alumina.

While it is preferred to use pure eta alumina, since the catalyst is then not only longer lasting but efficacious even at relatively low temperatures, such as at room temperature, it is as a matter of fact difficult to obtain the pure form. The best grade of eta alumina presently available analyzes about 95 percent by weight of the eta form. On the other hand, the alumina employed can contain as little as 5 percent by weight of eta alumina and still provide increased yields of dipentene and carvestrene as contemplated, but the effect is not as striking. One commercial grade of alumina presently available contains 20 percent to 30 percent of the eta form and has been successfully used. The preferred eta aluminas normally have an eta content from about 50 percent to about 75 percent by weight and are more effective because the isomerization proceeds satisfactorily at lower temperatures. One reason for operating at lower temperatures. that is below about 240° C., is that further isomerization of the dipentene-carvestrene produced from 3-carene to other less desirable terpenes is minimized. For example, above about 240° C. some of the dipentene is converted to terpinolene, and some of the carvestrene is isomerized to sylveterpinolene. These secondary isomerization reactions are probably the main cause of lower yields of dipentene-carvestrene with alumina catalyst low in eta content which normally requires higher temperatures for operation. When such high temperatures are employed for the primary isomerization to dipentene-carvestrene, the secondary isomerization reaction then also tends to compete significantly to lower the yield of desired products by destroying some of the dipentene-carvestrene.

When the alumina is not 100 percent of the eta form, the balance normally comprises other aluminas, such as beta alumina, gamma alumina, pseudo-gamma alumina, amorphous aluminas, and trace amounts of still other other compounds such as silica, sodium oxide, iron oxide, etc. The Greek-letter designations of aluminas used herein are those of the American (Alcoa) nomenclature.

The physical form of the eta alumina is not critical to the invention. For example, it may be in either powder or pellet form. As a powder, a screen analysis of the alumina may be essentially 35 percent through 200 mesh and at least 1 percent on 30 mesh, U.S. standard sieve. As a pellet, the eta alumina may measure up to about 0.25 inch on each side. For instance, spheres of alumina measuring 0.25 inch by 8 mesh, U.S. standard sieve, have been found quite satisfactory. To make the pellets or spheres or other similar shapes, the alumina can be extruded and then sliced to a desired size.

In carrying out the process, the 3-carene may be contacted by the eta alumina in any convenient manner. For example, the alumina may be placed in a column, maintained at a desired temperature, as by a constant temperature bath, and the carene pumped therethrough. The process may be practiced either as a batch or continuous operation, with or without recycling. The desired catalytic conversion can take place at a temperature within the range from about room temperature, that is about 20° C., to about 260° C. However, at the lower portion of this range, relatively fresh or pure eta alumina should be used, and the rate of conversion is relatively slow. Temperatures above about 260° C. rapidly destroy the effectiveness of the catalyst as eta alumina and can lead to formation of unwanted terpenes such as the cymenes. A desirable operating range is from about 100° C. to about 240° C.

The 3-carene may be converted from either a liquid or vapor phase. Preferably, however, a vapor phase is used, since this does not require as active a catalyst and/ or the same catalyst can be used somewhat longer without shut-down. Since, under standard conditions, 3-carene vaporizes at about 170° C., the vapor phase operation is preferably carried out from about 170° C. to about 240° C.

Operable residence time for the 3-carene and eta alumina depends on many factors, such as purity of the catalyst, age of the catalyst, physical form of the catalyst, temperature of the operation, and the like. With highly active, relatively pure catalysts, high temperature operation, the residence time may be as short as 0.5 second. At the other extremity, the residence time can extend to as long as 300 seconds. One successful run involved a residence time calculated on a feed of about 0.3 pound of 3-carene per hour per pound of catalyst.

Sulfur compounds appear to poison the catalyst, and accordingly the feed preferably is limited to no more than about 8 to 10 parts per million of sulfur. By adding relatively small amounts of a polar substance to the 3-carene, for example hydrogen chloride, steam, and the like, the time and temperature of the conversion reaction can be reduced.

In general, the isomerization reaction may be indicated as follows:

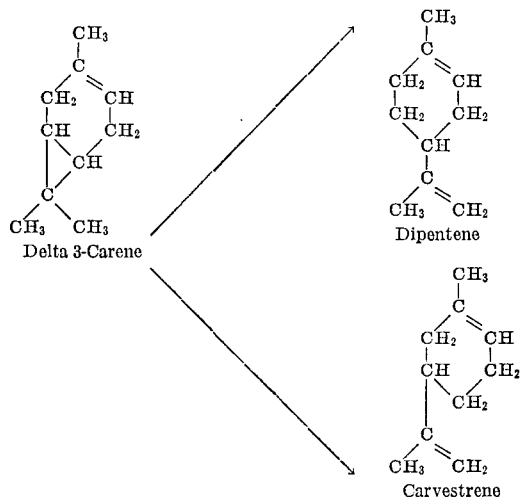

Delta 3-Carene
Dipentene
Carvestrene

During the catalytic conversion, the cyclopropane ring on the 3-carene molecule is broken, and either dipentene or carvestrene is formed, depending on which of two bonds is broken to two different, adjacent nuclear carbon atoms in the carene ring. The probability of breaking either bond is roughly one out of two, so that the resulting mixture of dipentene and carvestrene contains substantially equal molar quantities of each. The reaction is endothermic so that normally a source of heat is provided to maintain the operation isothermal. The terms "dipentene" and "carvestrene" generally refer to racemic mixtures which include as well the corresponding optically active forms, limonene and sylvestrene. The latter have the same chemical structure as above indicated for dipentene and carvestrene, respectively. During the present process, both optically active and optionally inactive forms are produced and are encompassed here and in the claims by the terms "dipentene" and "carvestrene."

In accordance with the present invention, it is as a rule possible to achieve at least 50 percent by weight conversion of the 3-carene per pass to an isomate of which at least 70 percent by weight is a mixture of the desired dipentene and carvestrene. The remaining components of the isomate may comprise unreacted 3-carene, menthadienes such as alpha terpinene, terpinolene and sylveterpinoline, and m- and p-cymene, although the use of eta alumina has been found to suppress relatively the formation of unwanted side-products. When the process is practiced as a continuous operation, the isomate mixture can, if desired, be recycled one or more times.

The resulting isomate mixture may be purified by removing unreacted 3-carene and any unwanted menthadienes present, as by fractional distillation, to recover a mixture of dipentene and carvestrene. Although it is difficult to separate such a mixture because of the close boiling points of dipentene and carvestrene, it can be done if desired, for example, to obtain a pure amount of either terpene for investigative work. Accordingly, the present invention does contemplate the recovery of either pure or substantially pure dipentene or carvestrene. However, it is more practical and less expensive to retain the dipentene and carvestrene in admixture and to use the mixture itself, especially in preparing terpene resins.

The catalyst may be reactivated by passing over it air sufficiently diluted with nitrogen to have about 2 percent oxygen concentration and a maximum combustion front temperature of 400° C. The hot stage travels upwardly in a vertical reactor, for example, when the combustion gases are introduced in the bottom of the reactor for reactivation of the catalyst. The catalyst may also be activated by washing it with solvent combinations to remove polymers which may have fouled the catalyst surface.

The following examples are intended to illustrate the invention and should not be construed as limiting the claims. Indicated temperatures are on the centigrade scale and percentages are by weight, unless otherwise indicated. Analyses were by vapor phase chromatography.

Example 1

Although a continuous process is preferable, since higher conversion rates and yields are usually obtained within a much shorter time, it is possible to carry out the present invention as a batch operation. In the following data for a batch operation, eta alumina obtained from the Davison Chemical Division of the Grace Company was used and analyzed about 95 percent by weight eta alumina, the balance being substantially gamma alumina. The catalyst was used either as a coarse or fine powder having these physical analyses:

TABLE II

| Grade | Coarse | Fine |
| --- | --- | --- |
| Volatile content (1,750° F.), wt. percent | 3 | 3 |
| Surface area, sq. m./gm | 230 | 230 |
| On 30 mesh (U.S.) | 15 | 1 |
| On 100 mesh (U.S.) | 60 | 20 |
| On 200 mesh (U.S.) | 65 | 35 |
| Bulk density, lb./cu. ft | 35.4 | 35.4 |

Using 100 grams of the fine eta alumina (although the coarse grade could have been used as well) with 200 grams of 3-carene at a reflux temperature of 170°, an isomate was produced after only two hours which analyzed 30 percent of a mixture of dipentene and carvestrene, 60 percent 3-carene, and 10 percent cymenes and other minor products. It is possible to reach higher conversion yields by a batch operation, but a longer period of time is necessary as exemplified by the immediately succeeding examples.

Examples 2 through 8

Another eta alumina available from the Kaiser Chemical Company and designated as KA-201 had the following analysis. About 20 to 30 percent of the alumina was in the eta form Chemical analysis:
  $Na_2O$, percent _____ 0.30
  $SiO_2$, percent _____ 0.02
  $Fe_2O_3$, percent _____ 0.02
  $TiO_2$, percent _____ 0.002
  Loss on ignition, percent _____ 6.0
  $Al_2O_3$, percent _____ 93.6

Physical properties:
- Surface area, m.²/g. — 380
- Pore volume, cc./g. — 0.51
- Pore diameter, average — 50
- Bulk density (packed) lbs./ft.³ — 47–48
- Crushing strength, lbs. — 50
- Abrasion loss, percent — 0.3
- Static sorption at 60% R.H., percent — 21–22

This eta alumina was used in the form of pellets measuring 0.25 inch by 8 mesh, U.S. standard sieve. To 300 grams of such pellets were added 300 grams of 3-carene, and the mixture heated and allowed to stand at a relatively low temperature of 160° to 165°. The following data were collected:

| Example | Time, days | Percent dipentene-carvestrene | Percent carene | Percent others |
|---|---|---|---|---|
| 2 | 0.42 | 19.7 | 75.8 | 3.8 |
| 3 | 1.5 | 30.8 | 56.6 | 4.4 |
| 4 | 4.0 | 45.2 | 38.1 | 9.2 |
| 5 | 6.9 | 49.1 | 32.3 | 11.3 |
| 6 | 7.9 | 51.4 | 29.0 | 11.4 |
| 7 | 11.6 | 54.0 | 26.0 | 12.0 |
| 8 | 13.6 | 58.6 | 22.3 | 12.1 |

Example 9

By stirring in a Parr autoclave at 190° 1000 grams of 3-carene with 100 grams of the eta alumina used in Examples 2 through 8, 20 to 25 percent dipentene-carvestrene was formed in about 20 hours with a negligible amount of cymenes. The temperature rose to 240° and was cooled to 220°, where after 6 hours, 50 percent dipentene-carvestrene and 15 percent cymenes were found to be present. Most of the cymenes were probably formed while the temperature was at 240°.

Example 10

As an example of a continuous operation of the present process, the eta alumina of Example 1 was packed into a copper tube measuring 0.625 inch in width and 6 feet in height. The copper tube was immersed in a silicone oil bath maintained at 185°, while 3-carene was pumped through the tube at a flow rate of 0.73 milliliter per minute. The copper tube was operated for 11 days at 175° to 185° before it was shut down. It consistently produced about 60 percent of a dipentene-carvestrene mixture from the charge. As an example, one analysis showed 67 percent dipentene-carvestrene, 18 percent unreacted carene, 8 percent cymenes, and 7 percent of other related products.

Examples 11 through 14

The eta alumina of Example 1 was dried at 200° for 20 hours, and 242 grams of the dried catalyst were then packed into a copper tube measuring 0.625 inch in diameter and 6 feet in height. The tube was placed in a container fitted with heaters and filled with silicon oil, and 3-carene was then pumped through the copper column. The results of representative samples were:

| Example | Flow rate, ml./min. | Column temp., deg. C. | Percent dipentene-carvestrene | Percent carene | Percent cymenes and other menthadienes |
|---|---|---|---|---|---|
| 11 | 2.5 | 210 | 51 | 33 | 16 |
| 12 | 2.5 | 215 | 56 | 21 | 20 |
| 13 | 2.5 | 220 | 52 | 20 | 28 |
| 14 | 2.5 | 220 | 42 | 10 | 40 |

Examples 15 through 17

Recycling 400 milliliters of partially isomerized product produced in accordance with the present invention through the column of Examples 11 through 14, gave the following results:

| Example | No. times recycled | Flow rate, ml./min. | Column temp., deg. C. | Percent dipentene-carvestrene | Percent carene | Percent cymenes and other menthadienes |
|---|---|---|---|---|---|---|
| 15 | 0 | 0.55 | 175 | 60 | 33 | 6 |
| 16 | 1 | 0.55 | 175 | 60 | 25 | 9.5 |
| 17 | 2 | 0.55 | 175 | 64 | 13 | 16 |

Example 18

The following results were obtained using the copper tube apparatus of Examples 11 through 14, except that the tube contained 240 grams of the eta alumina of Examples 2 through 8. The eta alumina was present as pellets measuring 0.25 inch by 8 mesh U.S. standard sieve:

At 180°, 3-carene was pumped through the tube continuously at a rate of 0.61 ml. per minute for a period of 28 hours. A representative sample analyzed by vapor phase chromatography showed 51 percent carene, 39 percent dipentene-carvestrene, 8 percent cymene and terpinolene, and 2 percent of sylveterpinolene. The temperature of the oil bath was raised to 190° (2.5 hours required), and the 3-carene was pumped through at 0.61 ml./min. for a total of 22 hours. A typical sample then showed 43 percent carene, 44 percent dipentene-carvestrene, 10 percent cymenes and terpinolenes, and 2 percent sylveterpinolene.

At 200° and a flow rate of 2.85 milliliters per minute of 3-carene, the product emerging from the tube after 24 hours of continuous operation analyzed: 35 percent carene, 49 percent dipentene-carvestrene, 12 percent cymenes and terpinolene, and 4 percent sylveterpinolene.

Examples 19 through 21

Three terpene resins were conventionally prepared from dipentene-carvestrene obtained in accordance with the present invention using aluminum chloride as the catalyst. The composition of the starting material and the yield and softening points of the resins are as follows. Example 20 was run using crude product obtained directly from an isomerization column. Examples 19 and 21 were performed on distilled products:

| Example | Percent dipentene-carvestrene | Percent carene | Resin yield | Resin S.P., degrees |
|---|---|---|---|---|
| 19 | 100 | 0 | 94 | 147 |
| 20 | 59.8 | 21.1 | 67 | 103 |
| 21 | 87 | 7 | 80 | 136 |

It is also possible to practice the present process in a semi-continuous manner. For example, a tube or tower, like that described in Example 10, may be continuously operated, until the conversion to dipentene-carvestrene reaches an undesirable low value, such as about 35 percent to about 40 percent. The catalyst may then be reactivated as previously described, and the tower operation restarted.

In addition, it is within the contemplation of the present invention to practice the process using a fluid bed technique. More particularly, the eta alumina may be supported during a relatively slow, downward descent in a tower by an upwardly passing stream of 3-carene, preferably in vapor form. The effluent vapors of dipentene-carvestrene may be treated as before. At the base of the tower, the alumina catalyst may pass to a regenerative chamber to revive the catalyst before reentering the top of the tower. Longer runs with the same catalyst charge are possible in this manner.

As an example, a catalyst which can be used in a fluidized bed catalyst process can be alumina comprising a desired proportion of eta alumina, say about 50%. The average effective diameter of such catalyst particles will range from about 40 microns to about 60 microns, typically being about 53 microns. Typically, also, in such operation about 99 percent by weight of such catalyst is finer than 150 microns, about 78 percent is finer than 74 microns, and about 2 percent is finer than 20 microns for practical fluidizing in conventional manner.

Resins made from the dipentene-carvestrene products of the conversion described herein are more fully dealt with in the copending, commonly-assigned U.S. patent application of John M. Derfer, Ser. No. 527,045, filed Feb. 14, 1966, now Pat. No. 3,466,267 entitled "Terpene Resin Compositions." Disclosure of said application is incorporated herein by reference.

Although the foregoing describes several embodiments of the present invention, it is understood that the invention may be practiced as still other forms within the scope of the following claims.

What is claimed is:

1. In a process for catalytically converting 3-carene to dipentene or carvestrene by contacting the 3-carene with alumina as the catalyst; the improvement comprising using eta alumina.

2. The process of claim 1 wherein both dipentene and carvestrene are formed as a mixture from the 3-carene.

3. The process of claim 1 wherein the alumina used comprises about 5 percent to about 95 percent by weight of eta alumina.

4. The process of claim 1 wherein said contacting with eta alumina occurs at a temperature within the range of about 20° C. to about 260° C.

5. The process of claim 1 wherein said 3-carene is contacted while in the vapor phase.

6. The process of claim 1 wherein said eta alumina is in powder form having a screen analysis of about 35 percent through 200 mesh and at least 1 percent on 30 mesh, U.S. standard sieve.

7. The process of claim 1 wherein said eta alumina is in pellet form measuring up to about 0.25 inch on each side.

8. The process of claim 1 wherein said alumina and 3-carene have a residence time from about 0.5 second to about 300 seconds.

9. The process of claim 1 wherein at least 50 percent by weight of said 3-carene is converted to an isomate of which at least 70 percent by weight is a mixture of dipentene and carvestrene.

References Cited

UNITED STATES PATENTS 3,407,242  10/1968  Booth _____ 260—675.5

FOREIGN PATENTS 944,489  6/1956  Germany.

OTHER REFERENCES

Yeddanapalli & Desikan, "Vapor-phase Catalytic Transformations of 3-Carene," CA 58 2473c (1963).

J. Verghese: "3-Carene, Versatile Terpene," Perfumery and Ess. Oils Record, 56 439 (1965).

DELBERT E. GANTZ, Primary Examiner

G. E. SCHMITKONS, Assistant Examiner

U.S. Cl. X.R.

252—463; 260—80.7, 666A